Nov. 22, 1927.
W. A. GEIGER
1,650,439
FRICTION SHOCK ABSORBING MECHANISM
Filed Feb. 24, 1925  2 Sheets-Sheet 2
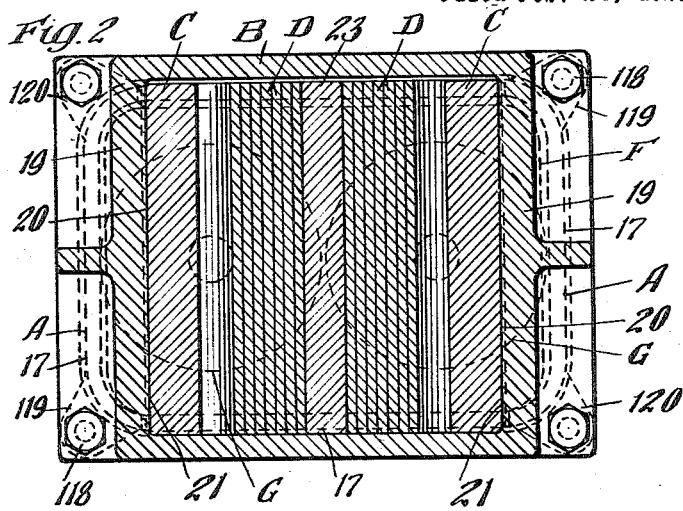
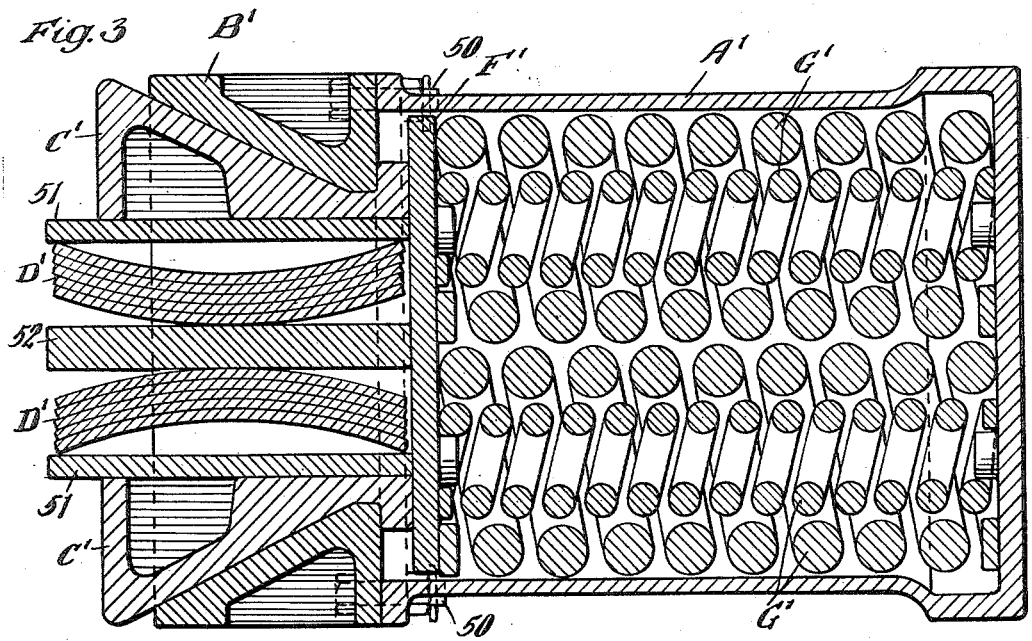
Inventor
William A. Geiger
By George I. Haight
His Atty.

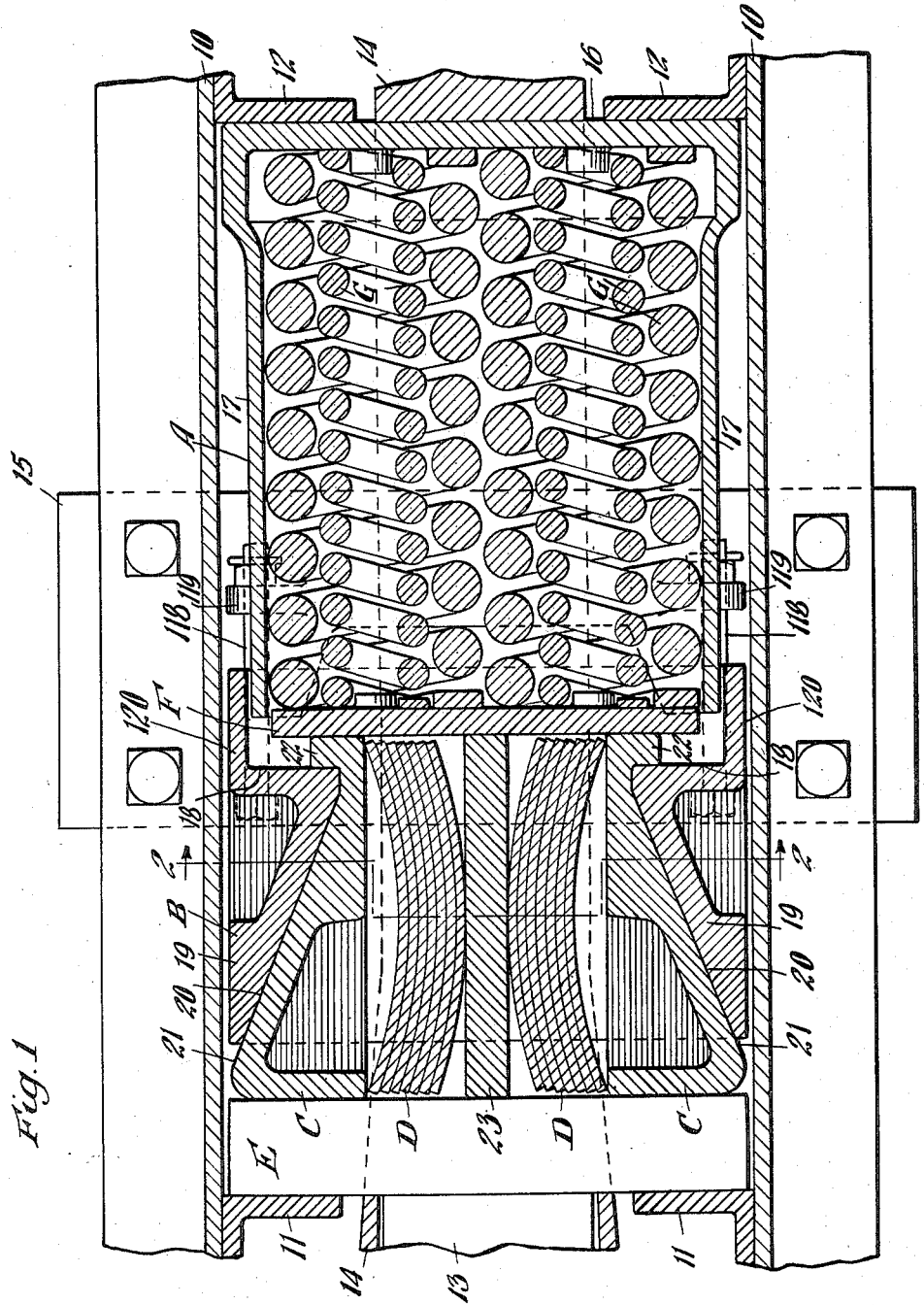

Patented Nov. 22, 1927.

1,650,439

UNITED STATES PATENT OFFICE.

WILLIAM A. GEIGER, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed February 24, 1925. Serial No. 11,032.

This invention relates to improvements in friction shock absorbing mechanisms.

One object of the invention is to provide a high capacity friction shock absorbing mechanism having preliminary spring action.

Another object of the invention is to provide a mechanism of the character indicated, especially adapted for railway draft riggings, including a main spring resistance, a plurality of friction elements and a co-operating friction means, wherein the friction means and elements are arranged to move as a unit during a predetermined portion of the compression stroke of the mechanism, the shocks at that time being absorbed entirely by the main spring resistance.

A still further object of the invention is to provide a friction shock absorbing mechanism including a friction shell and a plurality of spring resisted friction shoes co-operating therewith, wherein the shell is adapted for limited movement during the compression of the mechanism to provide for a purely spring resistance during a predetermined preliminary portion of the compression stroke.

Still another object of the invention is to provide a friction shock absorbing mechanism embodying a friction shell and a plurality of co-operating friction elements, the arrangement being such that there is an initial movement in unison of the shell and elements to absorb the lighter shocks and a subsequent relative movement of the friction elements and the shell to absorb the heavier shocks.

Other objects and advantages of the invention will more fully and clearly appear from the description and claims herinafter following.

In the drawings forming a part of this specification, Figure 1 is a longitudinal, horizontal, sectional view of a portion of a railway draft rigging showing my improvements in connection therewith. Figure 2 is a vertical transverse, sectional view corresponding substantially to the line 2—2 of Figure 1. And Figure 3 is a longitudinal, horizontal, sectional view of a portion of a railway draft rigging showing a slightly different embodiment of my invention.

Referring to Figures 1 and 2 of the drawings, 10—10 denote the usual channel shaped center or draft sills of a railway car underframe; to the inner faces of which are secured front stop lugs 11—11, and rear stop lugs 12—12, of usual construction. A portion of the drawbar is shown at 13, the same having operatively connected thereto a hooded yoke 14, of well known form, and within which is disposed the shock absorbing mechanism proper, hereinafter described in detail. The yoke and parts contained therewithin are supported in operative position by the detachable saddle plate 15.

The improved shock absorbing mechanism, as shown, comprises, broadly, a spring cage A; a friction shell B; a pair of friction shoes C—C; two sets of spring plates D—D; a front follower E, a spring follower F; and a twin spring resistance G.

The spring cage A is preferably of rectangular cross-section and is provided with a transverse rear wall 16 adapted to co-operate with the rear stop lugs 12 in the manner of the usual rear follower, the forward portion of the spring cage A being reduced in cross-sectional extent as indicated at 17. Slidably mounted on the forward end of the spring cage A is the friction shell B, said shell being rectangular in form and slightly larger so that the rear end of the same fits over the end of the spring cage and is adapted to have sliding movement with reference to the cage. The friction shell B is provided with inturned shoulders 18—18, which are adapted to abut against the outer end walls of the spring cage A so as to limit the inward movement of the friction shell. The outward movement of said shell 13 is limited by bolts 118, which extend through lugs 119 formed at the corners of the spring cage A, and through the webs 120 of the friction shell B. The inner faces of the side walls 19—19 converge inwardly of the shell thereby providing wedge faces 20—20 extending at an angle with reference to the longitudinal axis of the mechanism.

The friction shoes C—C are two in number and of similar construction, each of said shoes being provided with an outer flat face 21 correspondingly inclined to the wedge faces 20—20 of the friction shell, and adapted to co-act therewith. Each of the shoes is provided with an outwardly turned flange 22 adapted to co-act with the shoulders 18 on the friction shell B to prevent excessive outward movement of the friction shoes.

The two sets of spring plates D—D are interposed between the inner faces of the friction shoes C—C, and tend to yieldingly hold the friction shoes in spaced relation. Each of the sets of spring plates D—D comprises a plurality of nested curved plates, as clearly shown in Figure 1, bearing on the inner flat faces of the friction shoes C—C, the sets being disposed in opposite directions, and spaced apart by centrally arranged spacing plate 23. The inner ends of the friction shoes C—C are directly engaged by the spring follower plate F, coacting with the spring resistance G interposed between the follower plate F and the rear wall 16 of the spring cage. The outer ends of the friction shoes C—C engage the rear surface of the front follower E of the mechanism. The spring resistance G is inserted under initial compression and normally holds the parts in the position shown in Figure 1 with the flanges 22 of the friction shoes C—C in abutment with the shoulders 18—18 of the friction shell B.

The operation of the mechanism, assuming an inward or buffing movement of the drawbar is as follows: As the follower E is moved inwardly of the mechanism, the same will carry therewith the friction shoes C—C, the inner ends of the friction shoes C—C bearing upon the follower plate F and thus compressing the spring resistance G. At the same time the friction shell B will be carried rearwardly in unison with the friction shoes C—C. This action will continue until the shoulders 18—18 upon the friction shell come into engagement with the end of the spring cage A, whereupon rearward movement of the friction shell will be arrested, and the shoes C—C will thereafter be forced to move upon the friction surfaces 20—20 of the friction shell. Due to this action, the resistance offered will be greatly augmented. Inward movement of the front follower will be finally arrested by engagement thereof with the outer ends of the friction shell, thereby preventing the spring resistance element from being driven solid. Upon removal of the actuating or compression force, the friction shell and shoes will return to their original positions under the influence of the spring resistance G and the plates D—D, the bolts 118 serving to limit the outward movement of the shell, and the flanges 22 and shoulders 18—18, maintaining the friction shoes C—C against separation from the friction shell.

Referring to Figure 3, there is shown a slightly different embodiment of my invention, it being understood that the same will be mounted between the draft sills, and associated with stop lugs, a front follower, and yoke, in the same manner heretofore described in connection with the construction shown in Figures 1 and 2. In such Figure 3, A' represents a spring cage similar in construction to the spring cage A, except that the friction shell B' is fixedly secured thereto by suitable bolts 50—50, or said friction shell may be formed integrally with the spring cage A', if desired. The friction shell B' is the same in all respects as the friction shell B, except for the fact that it is fixed with reference to the spring cage A'. The friction shoes C'—C' also closely resemble the friction shoes C—C, except as shown, they are preferably made slightly less in length. Disposed between the friction shoes C—C are a pair of pressure-transmitting elements 51—51, such elements being of greater length than the friction shoes C'—C'. Interposed between the pressure-transmitting elements 51—51 are two sets of curved spring plates D'—D', the sets of plates being oppositely disposed, and separated by a central plate 52. The central plate 52 is of the same length as the pressure transmitting elements 51—51, and also acts as a pressure transmitting element, as well as a spacer for the springs D'—D'. The forward ends of the pressure-transmitting elements 51—51 and 52 are adapted to abut against the usual front follower (not shown), and against the spring follower F', which bears upon the main spring resistance G'.

In operation, upon inward movement of the usual front follower, the same will initially engage the outer ends of the pressure-transmitting elements 51—51 and 52, which movement will be transmitted directly to the main spring resistance G' through the spring follower F', during the preliminary portion of the compression stroke. During this preliminary action, a relatively slight amount of friction resistance will be created between the plates 51, and the shoes C'—C'. Upon continued inward movement of the follower, the same will eventually engage the outer ends of the friction shoes C'—C', thereafter causing inward movement of the friction shoes with reference to the friction shell B', whereby the resistance offered during the final portion of the compression stroke will be greatly augmented due to the frictional engagement between the shoes and the wedge friction surfaces of the friction shell, and induced flexing of the spring plates D'—D'. Upon the pressure being relieved, the spring resistance G' will force all the movable parts outwardly to their respective original positions.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a spring casing; of a main follower, said follower and casing being relatively movable; a main spring resistance disposed within said casing; a friction shell having inwardly converged wedge friction surfaces; friction shoes movable inwardly of the mechanism by engagement with the follower, said shoes having friction surfaces engaging with the shell surfaces and normally disposed in their outermost position with respect to the shell, said shoes being adapted for movement relatively toward each other, laterally; spring means interposed between the shoes resisting relative approach of the shoes; and pressure transmitting means interposed between the main follower and the main spring resistance for effecting compression of the main spring resistance for a predetermined initial portion of the compression stroke of the mechanism independently of any movement relatively between said friction shell and friction shoes during said preliminary portion of the compression stroke, said main spring resistance opposing movement of said shoes after said predetermined initial compression of the mechanism.

2. In a friction shock absorbing mechanism, the combination with a spring cage; of a main spring resistance within the cage; a main follower; a shell having friction wedge faces; a compressible sectional wedge co-acting with the friction shell and interposed between the main follower and main spring resistance, said shell and wedge being movable with respect to the spring cage during a predetermined preliminary portion of the compression stroke of the mechanism opposed by said main spring resistance; spring means interposed between the sections of the wedge tending to hold said wedge expanded; and means for arresting relative movement of the shell and cage to effect relative movement of the wedge and shell during the remaining portion of the compression stroke, the actuating force being transmitted from said wedge to the main spring resistance during said remaining portion of the stroke.

3. In a friction shock absorbing mechanism, the combination with a spring cage; of a spring resistance means within said cage; a friction shell, said shell and cage being relatively movable; means for limiting the movement of the shell with reference to the cage after a predetermined compression of the mechanism; a plurality of wedge friction shoes cooperating with the friction shell, movement of said shoes being resisted by the main spring resistance means during the entire compression stroke of the mechanism, and the outer ends of said shoes being adapted to receive the actuating force; and yielding means interposed between said shoes.

In witness that I claim the foregoing I have hereunto subscribed my name this 16th day of February, 1925.

WILLIAM A. GEIGER.